US012213478B2

(12) United States Patent
Serrat et al.

(10) Patent No.: US 12,213,478 B2
(45) Date of Patent: Feb. 4, 2025

(54) METHOD AND SYSTEM FOR TREATING PLANTS FOR USE IN AGRICULTURE, ANALYZING IMAGES CAPTURED BY CAMERA, AND IDENTIFYING THE PLANTS TO BE TREATED

(71) Applicant: BILBERRY SAS, Gentilly (FR)

(72) Inventors: Hugo Serrat, Gentilly (FR); Jules Beguerie, Gentilly (FR); Pierre Rouchaud, Gentilly (FR); Loïc Steunou, Gentilly (FR)

(73) Assignee: BILBERRY SAS, Gentilly (FR)

( * ) Notice: Subject to any disclaimer, the term of this patent is extended or adjusted under 35 U.S.C. 154(b) by 442 days.

(21) Appl. No.: 17/627,381

(22) PCT Filed: Jul. 16, 2020

(86) PCT No.: PCT/IB2020/056704
§ 371 (c)(1),
(2) Date: Jan. 14, 2022

(87) PCT Pub. No.: WO2021/009710
PCT Pub. Date: Jan. 21, 2021

(65) Prior Publication Data
US 2022/0256832 A1 Aug. 18, 2022

(30) Foreign Application Priority Data
Jul. 16, 2019 (FR) .................................... 1908025

(51) Int. Cl.
*A01M 7/00* (2006.01)
*A01C 23/00* (2006.01)
(Continued)

(52) U.S. Cl.
CPC ......... *A01M 7/0089* (2013.01); *A01C 23/007* (2013.01); *B05B 12/16* (2018.02); *G03B 15/02* (2013.01); *G06V 10/145* (2022.01)

(58) Field of Classification Search
None
See application file for complete search history.

(56) References Cited

U.S. PATENT DOCUMENTS

| 11,071,991 B2 * | 7/2021 | Serrat | G06F 18/2413 |
| 2018/0168141 A1 * | 6/2018 | Tanner | A01M 7/00 |
| 2022/0408715 A1 * | 12/2022 | Serrat | G05B 19/4155 |

FOREIGN PATENT DOCUMENTS

| EP | 1000540 A1 | 5/2000 |
| WO | 2007008079 A1 | 1/2007 |

(Continued)

OTHER PUBLICATIONS

International Search Report, and English translation, for corresponding International Application No. PCT/IB2020/056704, dated Nov. 13, 2020. 6 pages.

*Primary Examiner* — Haris Sabah

(57) ABSTRACT

A system for treating plants for use in agriculture, comprising a spray boom provided with a plurality of spray nozzles supplied by a spray control device, the apparatus comprising a set of cameras capable of capturing images of a crop area, a digital processing device capable of analyzing the images captured by the camera, identifying plants to be treated and sending commands to the spray control device with a view to selectively spraying a product on plants to be treated, the apparatus also comprising an arrangement for lighting the crop area captured by the cameras.
According to the invention, the lighting arrangement comprises a plurality of projectors distributed along the boom and having fields of illumination such that each point of a scene captured by a camera receives light from at least two (Continued)

projectors in at least two different orientations in a plane passing through the point and the projectors in question.

17 Claims, 3 Drawing Sheets

(51) Int. Cl.
*B05B 12/16* (2018.01)
*G03B 15/02* (2021.01)
*G06V 10/145* (2022.01)

(56) References Cited

FOREIGN PATENT DOCUMENTS

| WO | 2018142371 A1 | 8/2018 |
| WO | 2018154490 A1 | 8/2018 |

\* cited by examiner

METHOD AND SYSTEM FOR TREATING PLANTS FOR USE IN AGRICULTURE, ANALYZING IMAGES CAPTURED BY CAMERA, AND IDENTIFYING THE PLANTS TO BE TREATED

CROSS-REFERENCE TO RELATED PATENT APPLICATIONS

This application is a U.S. National Stage Application under 35 U.S.C. § 371 of International Patent Application No. PCT/IB2020/056704, filed Jul. 16, 2020, which claims the benefit of priority of French Patent Application numbers 1908025 filed Jul. 16, 2019, both of which are incorporated by reference in their entireties. The International Application was published on Jan. 21, 2021, as International Publication No. WO 2021/009710 A1.

FIELD OF THE INVENTION

The present invention relates, in a general manner, to the field of treatment of plants in the field of agriculture.

PRIOR ART

Methods and systems which make it possible to selectively treat adventive plants in crop areas are already known in particular from the documents WO2018142371A1 and WO2018154490A1 in the name of the applicant. A system of this kind comprises a spray boom that is moved by a tractor and equipped with a series of spaced spray nozzles. The boom also comprises one or more cameras which capture images of the field during the movement of the system, and one or more processing units which are capable, by means of learning-based image recognition techniques, of recognizing adventive plants in the captured images, and of controlling the spray nozzles in real time to apply a treatment, for example an herbicide treatment, only to the regions where the presence of the adventive plants is detected.

This system makes it possible to considerably reduce the use of phytosanitary products.

The recognition of species to be treated is achieved all the more effectively, the better the quality of the captured images. Thus, images provided with too low or too high a contrast, or indeed under-exposed or over-exposed images, make it difficult to identify the plants to be treated.

A system for treating plants comprising, in a manner integrated in a spraying device, a camera that is intended for recognition of plants by image processing, is known from the document WO2007/008079A1. A double lighting device is associated with the camera, having an overlap of the light beams in the advancement direction of the equipment.

The present invention aims to make it possible to obtain images of improved quality, in order to make the identification of plants to be treated more efficient, and thus to further minimize the consumption of treatment products, and in particular the impact on the environment.

SUMMARY OF THE INVENTION

For this purpose, a system is proposed for treating plants for use in agriculture, comprising a spray boom provided with a plurality of spray nozzles supplied by a spray control device, the apparatus comprising a set of cameras capable of capturing images of a crop area, a digital processing device capable of analyzing the images captured by the camera, identifying plants to be treated and sending commands to the spray control device with a view to selectively spraying a product on plants to be treated, the apparatus also comprising an arrangement for lighting the crop area captured by the cameras, said apparatus being characterized in that the lighting arrangement comprises a plurality of projectors distributed along the boom and having fields of illumination such that each point of a scene captured by a camera receives light from at least two projectors in at least two different orientations in a plane passing through said point and the projectors in question.

Preferred aspects of said system include the following optional additional features, taken individually or in any combination that a person skilled in the art would understand as being technically compatible:

- each projector is capable of generating a beam which is generally rectangular, and the angular width of which is greater than its angular height.
- the horizontal angular amplitude of the beam is between approximately 35 and 150°.
- the angular amplitude of the beam, in a vertical plane, is between approximately 3 and 60°.
- the emission characteristics of the projectors in the horizontal direction, the orientation, and their main axes, are such that, passing through a work zone captured by the cameras in a direction transverse to the movement direction, the variation in the quantity of light received does not exceed approximately 30%.
- the emission characteristics of the projectors in the horizontal direction, the orientation, and their main axes, are such that, passing through a work zone captured by the cameras in a direction transverse to the movement direction, the variation in the quantity of light received does not exceed approximately 20%.
- the projectors are arranged in lighting groups capable of creating light fluxes according to main axes of different orientations.
- the lighting groups are located in the vicinity of respective cameras.
- a light flux has a main axis neighboring the axis of the camera in the vicinity of which the group is located, and at least one other light flux has a main axis that is oblique with respect to the axis of said camera.
- two other light fluxes have two main axes which are oblique with respect to the axis of said camera.
- at least one lighting group comprises a set of light sources and a set of associated optics, forming just as many projectors.
- at least one lighting group comprises at least one light source that is common to two fluxes, and at least two optics capable of generating at least two corresponding fluxes according to two different main axes.
- the system comprises differentiated control means for light fluxes having different main axes.
- the light fluxes have a higher emission power the more their main axis is inclined with respect to the viewing axes of the cameras.
- the light sources are light-emitting diodes of a color temperature of between approximately 5000 and 6500° K, and more particularly close to 6000° K.
- the light-emitting diodes have a CRI of at least equal to 70, and preferably at least equal to 80.
- the system further comprises a light polarizer in front of at least some of the projectors, and a light polarizer in front of at least some cameras.

the polarizers associated with the projectors and the polarizers associated with the cameras are orthogonal linear polarizers.

BRIEF DESCRIPTION OF THE DRAWINGS

Other aspects, aims and advantages of the present invention will become clear upon reading the following detailed description of preferred embodiments of said invention, given by way of non-limiting example and with reference to the accompanying drawings, in which.

DETAILED DESCRIPTION OF PREFERRED EMBODIMENTS

Figure 1:
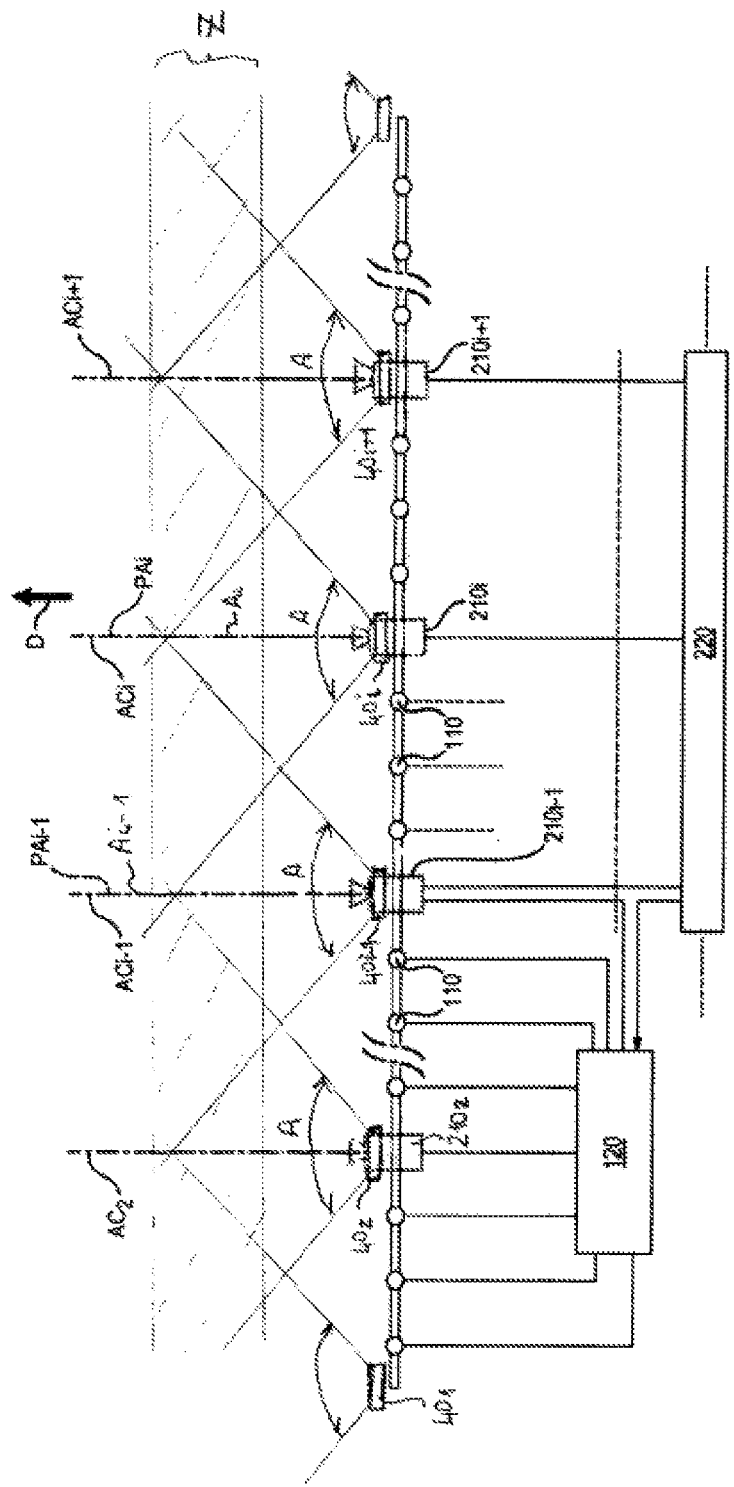
FIG. 1 is a schematic partial plan view of a spray boom according to a first embodiment of the present invention.
Figure 2:
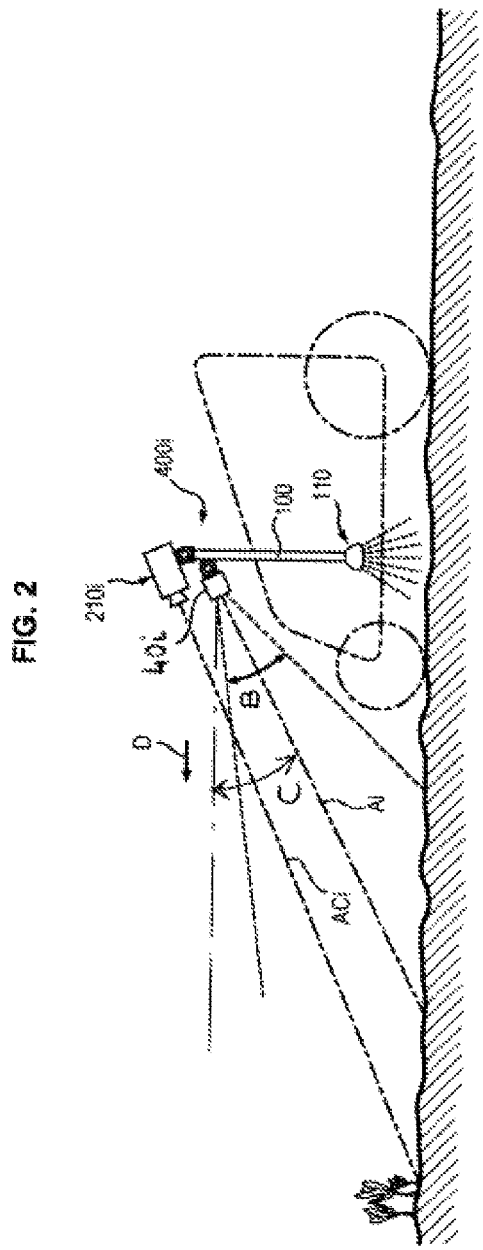
FIG. 2 is a partial side elevation view of the spray boom of FIG. 1.

With reference to FIGS. 1 and 2, a spray boom is shown which comprises, in a manner known per se, a carrier structure 100, for example made of metal, a series of spray nozzles 110 which are preferably regularly spaced along the boom, each nozzle being selectively supplied by a respective solenoid valve from a reservoir of product to be sprayed, pipes, and pressurization means, all in a manner known per se, under the control of a spray control unit 120. The boom is either integrated into a machine, or towed by a machine, or indeed borne by a machine.

In a manner that is also known, the boom 100 comprises a set of cameras 210$i$ (i being a sequence number proceeding from one end of the boom to the opposite end, and varying from 2 to n−1), the axes ACi of which are oriented in the descending direction in vertical planes in parallel with the movement direction D of the machine, and which are capable of capturing images of a field on which the boom 100 is moving, in order to identify plants to be treated. The overall recording region for all the cameras is represented, by way of example, by the hatched region Z.

The plants may be adventive plants on which it is wished to selectively spray an herbicide product, or indeed cultivated plants on which it is wished to selectively spray a phytosanitary product (insecticide, fertilizer, growth regulator, etc.).

Said cameras 210$i$ are connected to one or more digital processing units 220 which are capable of analyzing the images captured by the cameras in order to determine the presence of target plants. Said analysis is performed for example by decomposing each image into sub-images of a specified size, applying a convolution function to each of the sub-images using weight matrices, and determining a probability of the presence of a target plant depending on the result of the convolution. The document WO2018142371A1, in the name of the applicant, describes such techniques. Each time a plant to be treated is located in an image, its position in the image makes it possible to infer therefrom its real position on the region undergoing treatment, and the processing unit 220 addresses a command to the spray control device 120, in order to trigger spraying on a nozzle that is selected depending on said real position, and at a time selected depending on said position and advancement data of the machine available to the processing unit 220.

According to the invention, the boom also comprises a lighting device 400 made up, in this first embodiment, of a plurality of light projectors 40$i$ intended to illuminate the scenes captured by the respective cameras 210. In the present example, each projector 40$i$ is located below a respective camera 210$i$ and the main axis Ai thereof (typically the axis of symmetry of the beam generated) is located in a vertical plane PAi containing the axis ACi of said camera, being oriented in a descending manner.

In this case, each projector comprises a set of light sources of the light-emitting diode (LED) type which are mounted on a common support, and an associated optical system (common to all the LEDs or individual to each LED), such that the light beam created is substantially wider than it is high.

The width of the beam of each projector, determined by the angle A, is such that each site of the region to be treated which is located in front of the boom receives both a substantial quantity of the light generated by the closest projector, and also a substantial quantity of the light generated by the neighboring projector(s). The value of the angle A is typically between approximately 35 and 150°, and depends in particular on the spacing step of the projectors along the boom.

Furthermore, the angle of descent C of the main axis Ai of each projector 40$i$ (measured with respect to the horizontal), and the angle B covered by the beam in a vertical plane (see FIG. 2), are selected such that the beam covers the work zone Z, extending in a limited manner above and below said zone.

The value of the angle C is typically of between 10 and 90°, and depends on the angle of descent of the axes of the cameras (the angle of 90° corresponding to the case of vertical work). The value of the angle B is linked to the working recording field of the cameras in the vertical direction, to the angle of descent of the cameras, and to the distance of the work zone Z with respect to the cameras, and is typically between 3 and 60°, and will generally be a fraction of the value of the angle A.

As seen in FIG. 1, in the work zone Z, each site receives the light of two or indeed three adjacent projectors, having substantially different light orientations. In other words, each point of a scene captured by a camera 210$i$ is illuminated on the one hand by the light emitted at a relatively small angle by the closest projector 40$i$, and on the other hand at a more pronounced angle by the projectors 40$i$−1 and 40$i$+1 which are adjacent to the projector 40$i$ (and in a more secondary manner, and ignored here, by the further projectors).

This feature of lighting has two main advantages.

The first advantage is that images are thus obtained, in the region of each camera, of which the lighting has a homogeneity which is conducive to the recognition of plants to be treated, having a luminance deviation between the front zone of the plant and the lateral zones thereof which is lower than in the case of simple front lighting.

The second advantage is that the cumulation of the luminances obtained by the superposition of the lighting of the different projectors in the work zone Z varies little upon movement along said zone Z, transversely to the movement direction D of the boom. This variation is associated with the emission characteristics of each projector (mainly the variation of the luminance depending on the angle of emission in the descending plane perpendicular to the vertical plane), and it is possible to achieve a variability of the brightness which is less than 30%, indeed less than 20%. A similar variability according to the movement direction D can be obtained.

It is thus possible to cause each camera to operate not only with images that are not excessively contrasted, facilitating the recognition of plants, but also with images of which the brightness varies little, in order to thus remain in the recognition comfort zone.

Figure 3:
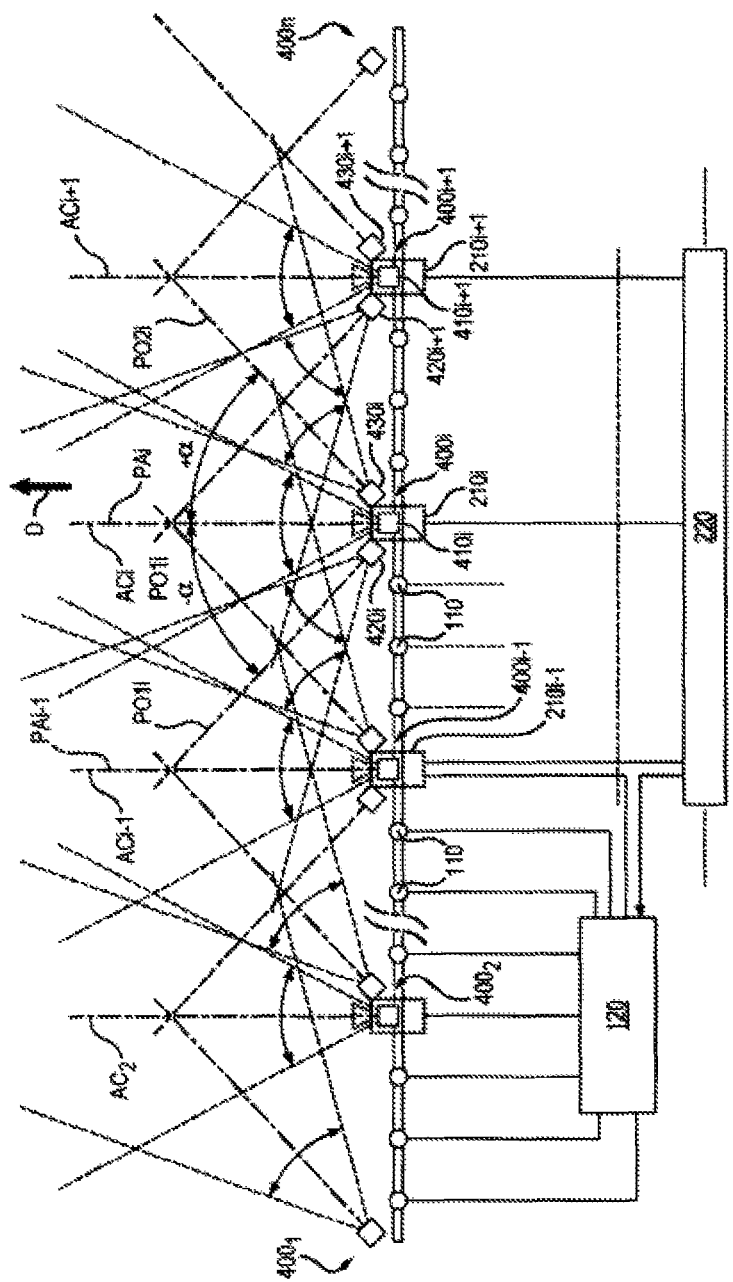
FIG. 3 is a schematic partial plan view of a spray boom according to a second embodiment of the invention.

In a second embodiment shown in FIG. 3 (where elements or parts similar to those of FIG. 1 are denoted by the same reference signs), the lighting device comprises a plurality of groups of light sources, said groups being denoted by reference sign 400*i*, and each group of sources 400*i* being located in the close vicinity of an associated camera 210*i*. Each group (except the end groups of the boom, as will be seen below) comprises a light source referred to as axial 410*i* having a descending main lighting axis Ai which is oriented so as to be substantially in parallel with the viewing axis of the associated camera, and thus located in the axial plane PAi, and two sources referred to as oblique 420*i*, 430*i*, the source 420*i* having a descending main lighting axis which is oriented in an oblique vertical plane PO1*i* forming an angle −E with the plane PAi, and the source 430*i* having a descending lighting axis oriented in an oblique vertical plane PO2*i* which is symmetrical to the plane PO1*i* with respect to the plane PAn, i.e. forming an angle +E with the plane PAi.

Thus, each scene captured by a camera 210*i* is illuminated on the one hand by the axial source 410*i* located in the close vicinity thereof, and on the other hand by the oblique sources 430*i*-1 and 420*i*+1 located in the region of the adjacent groups of sources 400*i*-1 and 400*i*+1, respectively.

In a general manner, it is advantageous for the fields of illumination of the sources to be such that each scene receives light from at least two light sources.

Thus images are obtained, in the region of the camera, of which the lighting has a homogeneity which is conducive to the recognition of plants to be treated, having a luminance deviation between the front zone of the plant and the lateral zones thereof which is lower than in the case of simple front lighting.

In an advantageous manner, the oblique sources generate a light density that is at least equal to that generated by the axial source. For this purpose, since the oblique sources are on average further from the filmed scene than the axial source is (the light having to travel an oblique path), the power of the oblique sources is preferably higher than that of the axial sources. This is because the relationship between the powers is linked at least approximately to the value of the angle E.

As shown in the left-hand part of FIG. 3, the end lighting groups (in this case 400₁, 400*n*), where there is no camera, are provided only with an oblique camera in the entry direction, 430₁ and 420*n*, respectively, for oblique lighting of the scene captured by the immediately adjacent camera (2102 and 210*n*-1, respectively).

By the same token, the lighting groups 4002, 400*n*-1 do not comprise a light source directed towards the outside, since there is no camera on this side and thus no scene to be lit obliquely.

A lighting device according to the invention is advantageously used in nighttime work, but can also be used to complement low daytime lighting.

Furthermore, during work involving strongly lateral sunlight (work at the start or end of the day, or in winter) it is possible, using the embodiment of FIG. 3, to control the light sources 410*i*, 420*i*, 430*i* selectively, so as to compensate the lateral nature of the sunlight, at least in part. If applicable, the control of the light sources can be automated depending on the ambient brightness, optionally measured in a directional manner using photocells facing in different directions (for example upwards and laterally).

As has been indicated above, in order to limit the power consumed by the sources, and thus the need for the machine to have onboard bulky and heavy batteries, the sources are advantageously light-emitting diodes.

It has furthermore been observed that a light having a high color temperature, preferably close to that of natural light and typically of between 5000 and 6500° K, made it possible to achieve a chlorophyll absorption/reflection law for the plants which is very suitable for image analysis.

It has furthermore been observed that the CRI (Color Rendering Index) value of the LED sources had an impact on the ability to generate images favorable to the recognition of plants. Thus, light-emitting diodes having a CRI of at least equal to 70, and preferably at least equal to 80, are preferably used, which reveal a good capacity for reproducing natural colors.

In a general manner, the spectrum of the light emitted by the sources may be advantageously adapted to the sensitivity spectrum of the cameras 210*i* and to the plant detection type used (detection by contours where a homogeneous contrast is desirable, colorimetric detection where there must be a significant component of the emitted light in the vicinity of a peak of reflection or absorption by the plant, etc.). This spectrum can also extend in the invisible range, when hyperspectral or multispectral cameras are used.

The light sources 410*n*, 420*n* and 430*n* are either of the direct lighting type, or equipped with optics such as reflectors and/or lenses so as to channel the light flux in a given solid angle. In this latter case, the reflective surfaces may be selected so as to generate a uniform light density.

However, for the case of the oblique sources, it is possible to provide asymmetrical reflectors which are intended to project a light intensity which is higher the further the points of the scene are from the source, so as to make the light density, on the plants to be identified, more homogeneous (between the furthest plants and the closest plants).

Of course, the present invention is in no way limited to the embodiments described and shown, but a person skilled in the art will be able to make numerous variations and amendments thereto. In particular:

the light sources may be arranged in a grouped manner, or not;

each group of light sources may comprise a number of sources that is different from three;

in order to define the general lighting axis, each light source may comprise light deflection and/or concentration and/or dispersion means; for example, a group of sources may comprise a single source, indeed a common group of sources, and optical elements which make it possible to generate light fluxes having lighting axes in two or three main directions, or indeed more;

the light sources or the groups thereof may be positioned in a manner associated with the position of the cameras or dissociated therefrom, according to a spacing identical to that of the cameras or different therefrom;

it is possible to use varied combinations of light sources, in terms of power, spectrum, flux distribution;

the type and the spectrum of emission of the light sources can largely vary depending on need, and in particular cover a spectrum extending beyond the visible in order to cooperate with hyperspectral or multispectral cameras;

it is possible to equip all or some of the light sources, and all or some of the cameras, with polarizers; said polarizers are preferably linear polarizers, having orthogonal axes between the source polarizers and the camera polarizers (analyzers); recourse to polarizers makes it possible to limit numerous parasitic reflections which may contaminate the images and compromise the recognition of the plants;

in the case of a boom mounted on a tractor, it is possible to provide different arrangements of the camera(s) and/or projector(s) in the region of the cab of the tractor; in particular, if cameras are provided on the cab at a greater height than the cameras mounted on the boom, then the selection, the number, and the arrangement of projectors can be adjusted accordingly.

The invention claimed is:

1. A system for treating plants for use in agriculture, comprising a spray boom provided with a plurality of spray nozzles supplied by a spray control device, the system further comprising a set of cameras capable of capturing images of a crop area, a digital processing device capable of analyzing the images captured by the camera, identifying plants to be treated and sending commands to the spray control device with a view to selectively spraying a product on plants to be treated, the system further comprising an arrangement for lighting the crop area captured by the cameras, the lighting arrangement comprising plurality of projectors distributed along the boom and having fields of illumination such that each point of a scene captured by a camera receives light from at least two projectors in at least two different orientations in a plane passing through said point and the projectors in question.

2. The system according to claim 1, characterized in that each projector is capable of generating a beam which is generally rectangular and the angular width of which is greater than its angular height.

3. The system according to claim 2, characterized in that the horizontal angular amplitude of the beam is between approximately 35 and 1500°.

4. The system according to claim 2, characterized in that the angular amplitude of the beam, in a vertical plane, is between approximately 3 and 60°.

5. The system according to claim 1, characterized in that the emission characteristics of the projectors in the horizontal direction, the orientation, and their main axes, are such that, passing through a work zone captured by the cameras in a direction transverse to the movement direction, the variation in the quantity of light received does not exceed approximately 30%, preferably approximately 20%.

6. The system according to claim 1, characterized in that the projectors are arranged in lighting groups capable of creating light fluxes according to main axes of different orientations.

7. The system according to claim 6, characterized in that the lighting groups are located in the vicinity of respective cameras.

8. The system according to claim 7, characterized in that a light flux has a main axis neighboring the axis of the camera in the vicinity of which the group is located, and at least one other light flux has a main axis that is oblique with respect to the axis of said camera.

9. The system according to claim 8, characterized in that two other light fluxes have two main axes which are oblique with respect to the axis of said camera.

10. The system according to claim 6, characterized in that said at least one lighting group comprises a set of light sources and a set of associated optics, forming just as many projectors.

11. The system according to claim 6, characterized in that at least one lighting group comprises at least one light source that is common to two fluxes, and at least two optics capable of generating at least two corresponding fluxes according to two different main axes.

12. The system according to claim 6, characterized in that it comprises differentiated control means for light fluxes having different main axes.

13. The system according to claim 6, characterized in that the light fluxes have a higher emission power the more their main axis is inclined with respect to the viewing axes of the cameras.

14. The system according to claim 1, characterized in that the light sources are light-emitting diodes of a color temperature of between approximately 5000 and 6500° K, and more particularly close to 6000° K.

15. The system according to claim 14, characterized in that the light-emitting diodes have a Color Rendering Index (CRI) of at least equal to 70, and preferably at least equal to 80.

16. The system according to claim 1, characterized in that it further comprises a light polarizer in front of at least some of the projectors, and a light polarizer in front of at least some cameras.

17. The system according to claim 16, characterized in that the polarizers associated with the projectors and the polarizers associated with the cameras are orthogonal linear polarizers.

* * * * *